United States Patent
Keswani et al.

(10) Patent No.: US 8,000,496 B2
(45) Date of Patent: Aug. 16, 2011

(54) COUPON COPY PROTECTION

(75) Inventors: Ravi Kant Keswani, Fremont, CA (US);
Manicka Muthugopalakrishna,
Fremont, CA (US); Qingcai Guan, San
Mateo, CA (US); Jeffrey Weitzman,
Palo Alto, CA (US)

(73) Assignee: Coupons.com Incorporated, Mt. View, CA (US)

( * ) Notice: Subject to any disclaimer, the term of this patent is extended or adjusted under 35 U.S.C. 154(b) by 0 days.

(21) Appl. No.: 13/010,667

(22) Filed: Jan. 20, 2011

(65) Prior Publication Data

US 2011/0103653 A1    May 5, 2011

Related U.S. Application Data

(63) Continuation of application No. 12/110,208, filed on Apr. 25, 2008.

(60) Provisional application No. 60/914,653, filed on Apr. 27, 2007.

(51) Int. Cl.
*G06K 9/00* (2006.01)
*G06Q 30/00* (2006.01)

(52) U.S. Cl. ............. 382/100; 382/284; 705/14.26

(58) Field of Classification Search ........... 382/100, 382/284, 164, 171, 173; 705/14.1, 14.26; 725/23; 345/634, 639
See application file for complete search history.

(56) References Cited

U.S. PATENT DOCUMENTS

| | | | |
|---|---|---|---|
| 4,791,281 A | 12/1988 | Johnsen et al. | |
| 4,882,675 A | 11/1989 | Nichtberger et al. | |
| 4,896,791 A | 1/1990 | Smith | |
| 4,910,672 A | 3/1990 | Off et al. | |
| 4,926,255 A | 5/1990 | Von Kohorn | |
| 4,949,256 A | 8/1990 | Humble | |
| 5,034,807 A | 7/1991 | Von Kohorn | |
| 5,056,019 A | 10/1991 | Schultz et al. | |
| 5,057,915 A | 10/1991 | Von Kohorn | |
| 5,245,533 A | 9/1993 | Marshall | |
| 5,283,731 A | 2/1994 | Lalonde | |
| 5,283,734 A | 2/1994 | Von Kohorn | |
| 5,285,278 A | 2/1994 | Holman | |
| 5,287,181 A | 2/1994 | Holman | |
| 5,305,195 A | 4/1994 | Murphy | |
| 5,305,197 A | 4/1994 | Axler et al. | |
| 5,353,218 A | 10/1994 | De Lapa et al. | |

(Continued)

FOREIGN PATENT DOCUMENTS

EP    0 512 509 B1    11/1992

(Continued)

OTHER PUBLICATIONS

Canadian Office Action received in International application No. 2,684,094 dated May 31, 2010 (4 pages), Nov. 6, 2008.

(Continued)

*Primary Examiner* — Yubin Hung
(74) *Attorney, Agent, or Firm* — Hickman Palermo Truong & Becker LLP; Shane T. Lunceford

(57) ABSTRACT

A data distribution system which includes business groups, a client system and a main database system is described. Coupons and coupon data may be exchanged between the business groups, the client system and the main database system. Each coupon being exchanged may include one or more fraud protection features that can neither be altered nor tampered by users, consumers or retailers.

10 Claims, 5 Drawing Sheets

U.S. PATENT DOCUMENTS

| | | | |
|---|---|---|---|
| 5,361,871 A | 11/1994 | Gupta | |
| 5,368,129 A | 11/1994 | Von Kohorn | |
| 5,380,991 A | 1/1995 | Valencia et al. | |
| 5,401,946 A | 3/1995 | Weinblatt | |
| 5,420,606 A | 5/1995 | Begum | |
| 5,459,306 A | 10/1995 | Stein et al. | |
| 5,483,049 A | 1/1996 | Schulze, Jr. | |
| 5,488,423 A | 1/1996 | Walkingshaw et al. | |
| 5,500,681 A | 3/1996 | Jones | |
| 5,502,636 A | 3/1996 | Clarke | |
| 5,504,519 A | 4/1996 | Remillard | |
| 5,508,731 A | 4/1996 | Von Kohorn | |
| 5,509,070 A | 4/1996 | Schull | |
| 5,528,490 A | 6/1996 | Hill | |
| 5,557,721 A | 9/1996 | Fite et al. | |
| 5,594,910 A | 1/1997 | Filepp | |
| 5,604,542 A | 2/1997 | Dedrick | |
| 5,612,527 A | 3/1997 | Ovadia | |
| 5,636,346 A | 6/1997 | Saxe | |
| 5,642,485 A | 6/1997 | Deaton | |
| 5,687,322 A | 11/1997 | Deaton et al. | |
| 5,697,844 A | 12/1997 | Von Kohorn | |
| 5,708,782 A | 1/1998 | Larson et al. | |
| 5,710,884 A | 1/1998 | Dedrick | |
| 5,710,886 A | 1/1998 | Christensen et al. | |
| 5,713,795 A | 2/1998 | Von Kohorn | |
| 5,715,314 A | 2/1998 | Payne | |
| 5,724,521 A | 3/1998 | Dedrick | |
| 5,759,101 A | 6/1998 | Von Kohorn | |
| 5,761,648 A | 6/1998 | Golden et al. | |
| 5,761,683 A | 6/1998 | Logan et al. | |
| 5,774,869 A | 6/1998 | Toader | |
| 5,791,991 A | 8/1998 | Small | |
| 5,802,203 A | 9/1998 | Black et al. | |
| 5,821,512 A | 10/1998 | O'Hagan et al. | |
| 5,822,735 A | 10/1998 | De Lapa et al. | |
| 5,845,302 A | 12/1998 | Cyman, Jr. | |
| 5,852,673 A | 12/1998 | Young | |
| 5,855,007 A | 12/1998 | Jovicic | |
| 5,884,033 A | 3/1999 | Duvall | |
| 5,903,874 A | 5/1999 | Leonard et al. | |
| 5,907,830 A | 5/1999 | Engel et al. | |
| 5,916,024 A | 6/1999 | Von Kohorn | |
| 5,918,211 A | 6/1999 | Sloane | |
| 5,918,213 A | 6/1999 | Bernard et al. | |
| 5,926,795 A | 7/1999 | Williams | |
| 5,969,678 A | 10/1999 | Stewart | |
| 5,979,757 A | 11/1999 | Tracy et al. | |
| 6,002,771 A | 12/1999 | Nielsen | |
| 6,006,269 A | 12/1999 | Phaal | |
| 6,009,411 A | 12/1999 | Kepecs | |
| 6,014,634 A * | 1/2000 | Scroggie et al. | 705/14.25 |
| 6,047,310 A | 4/2000 | Kamakura et al. | |
| 6,129,276 A | 10/2000 | Jelen et al. | |
| 6,134,532 A | 10/2000 | Lazarus et al. | |
| 6,185,541 B1 | 2/2001 | Scroggie et al. | |
| 6,292,786 B1 | 9/2001 | Deaton et al. | |
| 6,298,329 B1 | 10/2001 | Walker et al. | |
| 6,298,446 B1 | 10/2001 | Schreiber et al. | |
| 6,321,208 B1 | 11/2001 | Barnett et al. | |
| 6,332,127 B1 | 12/2001 | Bandera et al. | |
| 6,336,099 B1 | 1/2002 | Barnett et al. | |
| 6,360,254 B1 | 3/2002 | Linden et al. | |
| 6,377,935 B1 | 4/2002 | Deaton et al. | |
| 6,377,986 B1 | 4/2002 | Philyaw et al. | |
| 6,385,591 B1 | 5/2002 | Mankoff | |
| 6,434,530 B1 | 8/2002 | Sloane et al. | |
| 6,445,818 B1 * | 9/2002 | Kim et al. | 382/165 |
| 6,484,939 B1 | 11/2002 | Blaeuer | |
| 6,615,179 B1 | 9/2003 | McNicol et al. | |
| 6,638,316 B1 | 10/2003 | Tyler et al. | |
| 6,687,346 B1 | 2/2004 | Swartz et al. | |
| 6,862,575 B1 * | 3/2005 | Anttila et al. | 705/14.14 |
| 7,032,030 B1 | 4/2006 | Codignotto | |
| 7,191,945 B2 | 3/2007 | Havard | |
| 7,283,650 B1 * | 10/2007 | Sharma et al. | 382/118 |
| 7,356,182 B1 * | 4/2008 | Fleisher et al. | 382/171 |
| 2002/0194069 A1 * | 12/2002 | Thakur et al. | 705/14 |
| 2003/0217329 A1 * | 11/2003 | Good | 715/500 |
| 2004/0193487 A1 | 9/2004 | Purcell et al. | |
| 2004/0230485 A1 | 11/2004 | Barnett et al. | |
| 2005/0018918 A1 | 1/2005 | Keithley | |
| 2005/0114211 A1 * | 5/2005 | Amjadi | 705/14 |
| 2005/0149404 A1 | 7/2005 | Barnett et al. | |
| 2005/0262005 A1 | 11/2005 | Woolston | |
| 2005/0264694 A1 * | 12/2005 | Ilan et al. | 348/473 |
| 2006/0053437 A1 * | 3/2006 | Bruner | 725/23 |
| 2006/0061088 A1 | 3/2006 | Harrington et al. | |
| 2006/0062456 A1 * | 3/2006 | Chiu et al. | 382/173 |
| 2006/0078159 A1 * | 4/2006 | Hamatake et al. | 382/100 |
| 2006/0100925 A1 * | 5/2006 | Finaly | 705/14 |
| 2006/0126932 A1 | 6/2006 | Eschbach | |
| 2006/0143307 A1 | 6/2006 | Codignotto | |
| 2006/0175403 A1 * | 8/2006 | Fossen McConnell et al. | 235/385 |
| 2006/0222240 A1 * | 10/2006 | Hirota et al. | 382/162 |
| 2007/0009153 A1 | 1/2007 | Gallafent et al. | |
| 2008/0041950 A1 * | 2/2008 | Michels | 235/419 |
| 2008/0065488 A1 * | 3/2008 | Schwagmann et al. | 705/14 |
| 2008/0065490 A1 * | 3/2008 | Novick et al. | 705/14 |
| 2008/0093468 A1 | 4/2008 | Fan et al. | |
| 2008/0221980 A1 * | 9/2008 | Greeson et al. | 705/14 |

FOREIGN PATENT DOCUMENTS

| | | |
|---|---|---|
| EP | 1 376 471 A1 | 1/2004 |
| GB | 2 426 904 A | 12/2006 |
| JP | 2002/298052 A | 10/2002 |
| WO | WO 95/01060 | 1/1995 |
| WO | WO 97/23838 | 7/1997 |

OTHER PUBLICATIONS

Current Claims of Canadian application No. 2,684,094 (4 pages).

"Acu-Trac and Cox Launch Interactive Couponing Service," Electronic Marketplace Report, IAC Newsletter Database, Information Access Company, Mar. 21, 1995, 2 pages.

Douglass, "Cruising for Food Savings on Internet," The San Diego Union-Tribune, Apr. 20, 1996, Section: Business, p. C1, 2 pages.

"Emaginet plans to 'push' its way into consumer mindest, pocketbook," Interactive Marketing News, vol. 4, No. 22, May 30, 1997, 2 pages.

Freitag, "In this Computer Age, Who Needs Coupons?," The New York Times, Jun. 15, 1989-p. A1 (2 pages).

Graham, I., "The HTML Sourcebook, $2^{nd}$ edition, A Complete Guide to HTML 3.0", Wiley Publishing Company, 1996, pp. 233-234.

ImageSafe, "ImageSaft-Image copy protection," undated, 3 pages. http://www.cellspark.com/imagesafe.html, Printed Mar. 29, 2010.

Spethmann, "Coupons Shed Low-Tech Image," Brandweek, Oct. 24, 1994, pp. 30-31. http://login.vnuemedia.com/bw/esearch/article_display.jsp?vnu_content_id=546705.

Sutherland, "Promotion Profile," Marketing & Media Decisions, vol. 24, No. 10, Oct. 1989, pp. 103(1).

Tanner, "A New Dimension in Marketing", Progressive Grocer, May 1987, pp. 133, 134 & 136.

"Tracking Shoppers with Personal Bar Codes," The New York Times, Jun. 18, 1989.

"Ukrop's Tests Data Base Marketing Program Electronic Couponing Tracks Buying Behavior of Valued Customers," Chain Store Age Executive, Sep. 1987, pp. 73-75.

Wilkies, "Catalina, Coupons Online in Tests," Advertising Age, Aug. 28, 1995, p. 15.

Anderson, "CoolSavings.com Settles Patent-Infringement Suit," The Industry Standard Magazine, Jan. 13, 2000, 2 pages. http://archives.cnn.com/2000/TECH/computing/04/03/coupon.patent.idg/index.html.

Anderson, "Online-coupon companies battle over patents," CNN.com—Technology, Apr. 3, 2000, 4 pages. http://web.archive.org/web/20010712032039/www.thestandard.com/article/0,1902,8853,00.html?.

Wolverton, "Coolsavings settles e-coupon patent dispute," CNET News, Jul. 10, 2000, 2 pages. http://news.cnet.com/Coolsavings-settles-e-coupon-patent-dispute/2100-1017_3-242969.html?tag=mncol.

Wolverton, "Coolsavings settle patent suite," CNET News, Dec. 13, 2000, 2 pages. http://news.cnet.com/Coolsavings-settles-patent-suit/2100-1017_3-249876.html?tag=mncol.

Notification Concerning Transmittal of International Preliminary Report on Patentability received in International application No. PCT/US08/61686 dated Nov. 5, 2009 (8 pages).

PCT Current Claims of International application No. PCT/US08/61686 dated Jan. 2011 (4 pages).

Canadian Office Action received in International application No.: 2,684,094 dated May 31, 2010 (4 pages).

Current Claims of Canadian application No.: 2,684,094 (4 pages). Nov. 6, 2008.

"Acu-Trac and Cox Launch Interactive Couponing Service," Electronic Marketplace Report, IAC Newsletter Database, Information Access Company, Mar. 21, 1995, 2 pages.

Douglass, "Cruising for Food Savings on Internet," The San Diego Union-Tribune, Apr. 20, 1996, Section: Business, p. C1, 2 pages.

"Emaginet plans to 'push' its way into consumer mindest, pocketbook," Interactive Marketing News, vol. 4, No. 22, May 30, 1997, 2 pages.

Freitag, "In this Computer Age, Who Needs Coupons?," The New York Times, Jun. 15, 1989—p. A1 (2 pages).

Graham, I., "The HTML Sourcebook, $2^{nd}$ edition, A Complete Guide to HTML 3.0", Wiley Publishing Company, 1996, pp. 233-234.

ImageSafe, "ImageSaft-Image copy protection," undated, 3 pages. http://www.cellspark.com/imagesafe.html.

European Patent Office, "European Search Report", Application No.: 08746977.1-1229, Applicant: Coupons, Inc., dated Apr. 29, 2011 (7 pages).

Current Claims in European Application No. 08746977.1-1229, Applicant: Coupons, Inc., dated Apr. 2011 (3 pages).

U.S. Appl. No. 12/110,208, File Date Apr. 25, 2008, Office Action, Mailing Date Apr. 26, 2011.

* cited by examiner

COUPON COPY PROTECTION

CROSS-REFERENCE TO RELATED APPLICATIONS

Benefit Claim

This application claims the benefit as a Continuation of application Ser. No. 12/110,208, titled "Coupon Copy Protection," filed Apr. 25, 2008 the entire contents of which is hereby incorporated by reference as if fully set forth herein, under 35 U.S.C. §120, and claims the benefit of Provisional Appln. No. 60/914,653, titled "Coupon Copy Protection," filed Apr. 27, 2007, the entire contents of which is hereby incorporated by reference as if fully set forth herein, under 35 U.S.C. §119(e). The applicant(s) hereby rescind any disclaimer of claim scope in the parent application(s) or the prosecution history thereof and advise the USPTO that the claims in this application may be broader than any claim in the parent application(s).

TECHNICAL FIELD

The subject matter of this application is generally related to coupon distribution.

BACKGROUND

Manufacturers, suppliers and service providers frequently issue discount coupons to attract and encourage potential consumers to purchase products and services (hereinafter collectively referred to as products). One objective of coupon issuance is to stimulate sales and boost revenue by drawing consumers to purchase specific products, and particularly, newly introduced products.

Conventionally, coupons can be distributed to consumers through mail, magazines, newspapers and other publications, and redeemed at local stores and retailers. With the exponential growth of the World Wide Web, manufacturers, suppliers and service providers have significantly increased the issuance of coupons over the Internet for consumers who purchase online or brick and mortar delivered products. Regardless of the delivery mechanism, a coupon traditionally contains transactional data such as product information, coupon value, expiration data, and other restrictions.

With the evolution of electronic coupons, the potential for coupon fraud also has increased. Sophisticated imaging techniques often can be used to create illegitimate coupons. Illegitimate coupons can contain tampered coupon values and expiration dates, and in some instances, completely phony promotions.

SUMMARY

Implementations of the invention can realize one or more of the following advantages. A coupon may include images such as holographic images that are resistant to unauthorized copying. The coupon also may include a unique identifier to increase the difficulty of producing a counterfeit version of the coupon. The coupon also includes a border embedded with coupon data unique to the coupon.

The details of one or more embodiments of the invention are set forth in the accompanying drawings and the description below. Other features, objects, and advantages of the invention will be apparent from the description and drawings, and from the claims.

DETAILED DESCRIPTION

System Overview

A data distribution system can be used for generating, storing, retrieving and manipulating coupon data. In some implementations, the data distribution system described herein includes internal logic to handle such tasks, and one or more databases or database servers configured to facilitate the organization and management of coupons and coupon distribution. For example, the data distribution system can include a coupon database server (as will be discussed in greater detail below) in which applications programs executing on clients and/or servers can send messages and data to a coupon database server in a predefined format for managing coupon creation and distribution. Generally, coupons can include certificates (e.g., cents-off, percent discount, etc.), cash values, vouchers for a discount and the like. Coupons also can include rebates, tickets, admittance tickets, gift certificates and the like.

Although these implementations are presented in the form of a database distribution system, it should be understood that the teachings herein may be applied more generally to any management system, including or in addition to management systems involving data distribution.

Figure 1:
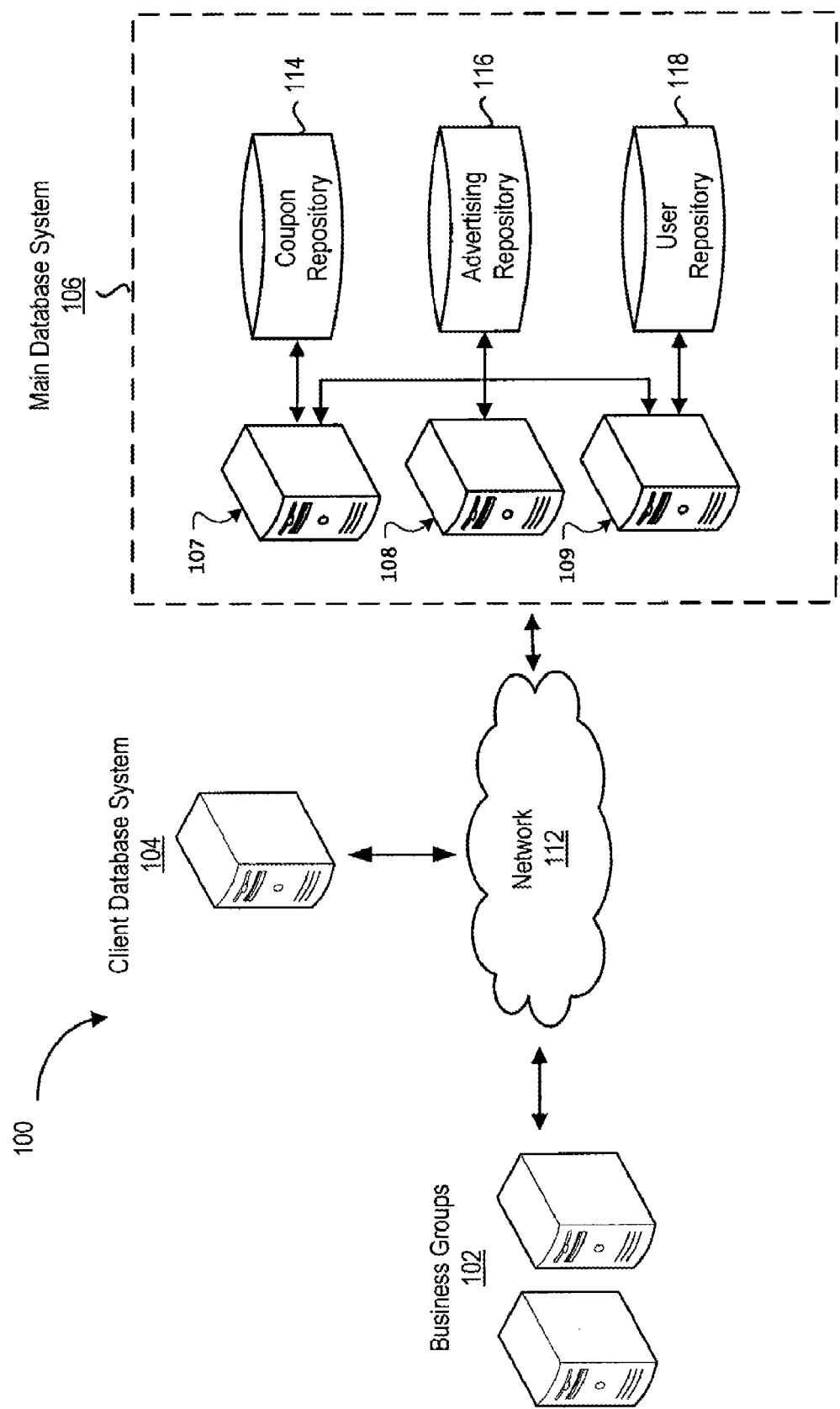
FIG. 1 shows an example of a data distribution system.

FIG. 1 shows an example of a data distribution system 100. Referring to FIG. 1, the data distribution system 100 generally includes business groups 102 (e.g., manufacturers, suppliers, service providers, advertisers and the like), a client system 104 and a main database system 104 that is remote from the client system 104. Though a client and server configuration is shown, other architectures are possible.

The business groups 102, the client system 104 and the main database system 106 can be connected by a network 112. The network 112 can facilitate wireless or landline communication between each entity. The network 112 may be all or a portion of an enterprise or secured network. While illustrated as single network, the network 112 may be a continuous network logically divided into various sub-nets or virtual networks without departing from the scope of this disclosure, so long as at least portion of the network 112 may facilitate communications and exchanges of coupons and coupon data between the business groups 102, the client system 104 and the main database system 106.

In some implementations, the network 112 encompasses any internal or external network, networks, sub-network, or combination thereof operable to facilitate communications between various computing components in system 100. The network 112 may communicate, for example, Internet Protocol (IP) packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations.

Main Database System

The main database system 106, which facilitates the generation and distribution of coupons, can include various servers such as database servers, application servers and/or other software/hardware components. In some implementations, the database servers, application servers and/or software/hardware components of the main database system 106 can be configured to be connected to, or otherwise receive coupon information from, the business groups 102. This function may be performed by a direct electronic connection with the business groups 102, or may involve loading data from a physically transportable data storage medium (e.g., diskette, tape, CD-ROM, etc.). The business groups 102 can issue an associated set of instructions that define how each coupon is to be distributed. For example, such instructions can include restrictions as to a number of coupons that any one user may print out for redemption, or guidelines that only users belonging to a particular demographic group or residing in a geographic location can access a selected group of coupons.

Further, these database servers, application servers and/or software/hardware components of the main database system 106 can be configured to receive advertising information from the business groups 102. Similar to receiving coupon information, this function can be performed by direct electronic connection with the advertising sponsors' systems, or may involve loading data from a physically transportable data storage medium (i.e., diskette, tape, CD-ROM, etc.). In some instances, when a user prints out a coupon, one or more advertising impressions can be displayed on the printed coupon.

Business groups 102 may register with the main database system 106 to establish a coupon program. In one implementation, registration includes downloading and executing an executable program that facilitates the electronic communication between the main database system 106 and the business groups 102. Once registered, the main database system 106 may receive coupon data such as, without limitation, an identification of a product, a discount or coupon value for the product, a bar code of the product, and expiration data from the business groups 102.

Exemplary Database Servers and Repositories

As illustrated in FIG. 1, the main database system 106 can include a coupon server 107 coupled to a coupon repository 114 for storing coupons and coupon data, an advertising server 108 coupled to an advertising repository 116 for generating and storing advertising information associated with one or more coupons, and a user server 109 coupled to an user repository 118 for tracking and recording user transaction history. Each server 107-109 can include one or more physical, individual general purpose computing systems, which can be arranged in a cluster environment. In these implementations, additional computing systems also may be added to provide for load balancing (e.g., scalability, and the ability to quickly add additional hardware as load and responsiveness criteria require). Each server also can be configured to operate using SQL server software, such as Microsoft SQL Server®, commercially available from Microsoft Corporation of Redmond, Wash. In alternative implementations, the functions of plural servers can be performed by a single server device.

Figure 3:
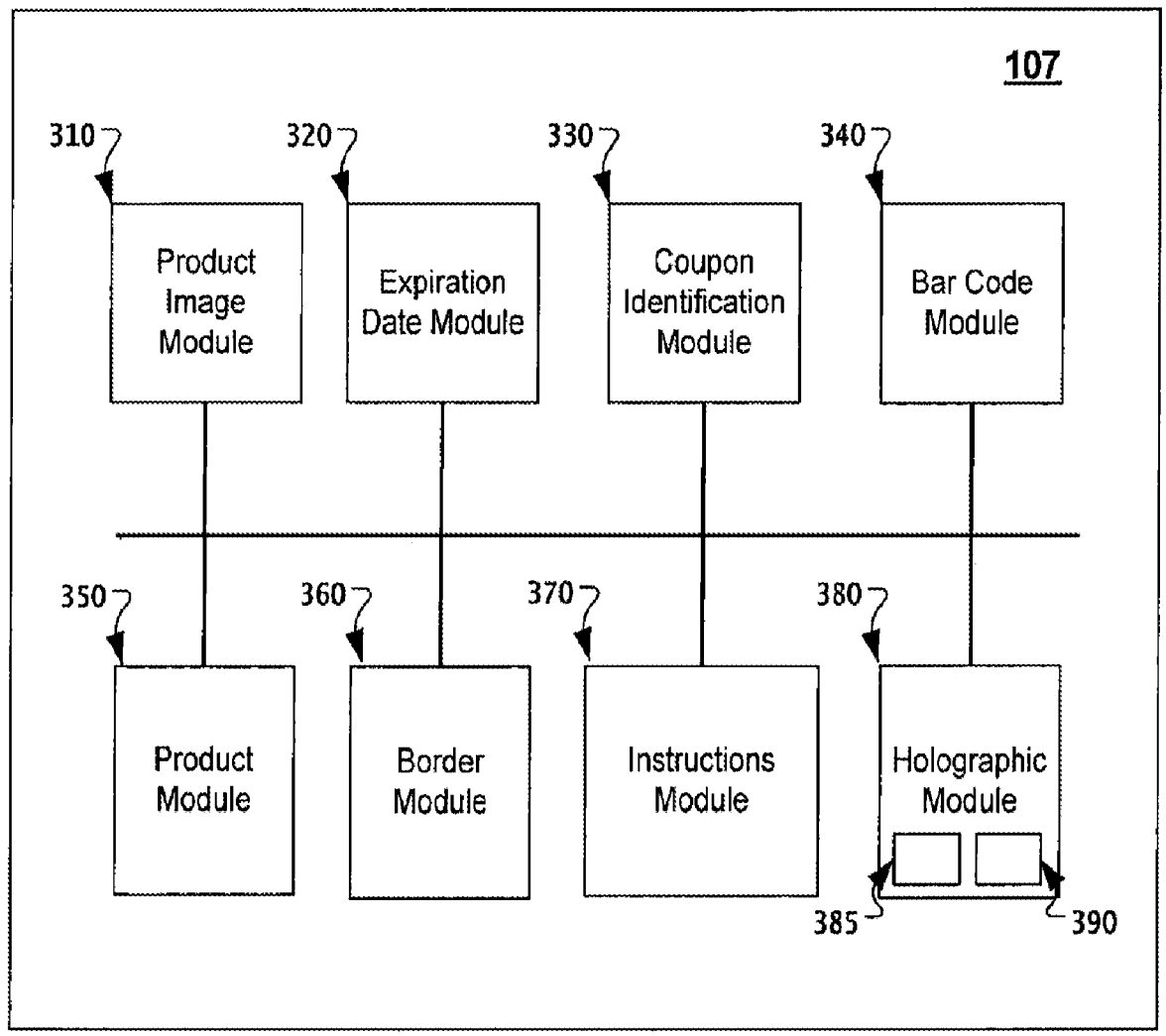
FIG. 3 shows examples of components of a coupon database server.

The coupon server 107 can facilitate the generation of coupons based on coupon data received from the business groups 102. FIG. 3 shows exemplary components of the coupon server 107. Referring to FIG. 3, the coupon server 107 includes: a product image module 310 for displaying/generating/removing/updating a product image; an expiration date module 320 for receiving and displaying expiration data from the business groups 102; a coupon identification module 330 for generating an identifier (and associated bar code) unique to each coupon; a bar code module 340 for generating a bar code that identifies a product; a product module 350 for setting forth product information (e.g., coupon values, applicable items and the like); a border module 360 for rendering a border that may embed coupon information identifying, for example, a specific coupon, time and date on which the coupon is printed and coupon value; an instructions module 370 for imprinting rules, policies and instructions associated with the usage of the coupon; and a graphic module 380 that includes a segmentation module 385 and an analysis module 390 for producing images (e.g., holographic) that can be overlaid, for example, over the expiration date, coupon value and other data to prevent unauthorized manipulation.

Modules 310-390 can be communicatively coupled to one or more of each other. Though the modules identified above are described as being separate or distinct, one or more of the modules may be combined in a single process or routine. The functional description provided herein including separation of responsibility for distinct functions is exemplary. Other groupings or other divisions of functional responsibilities can be made as necessary or in accordance with design preferences.

Referring back to FIG. 1, coupons generated by the coupon server 107 as well as coupon data received from the business groups 102 may be stored in the coupon repository 114. The coupon repository 114 also may store information such as, without limitation, names of manufacturers, descriptions of products, coupon values, coupon restrictions such as the number of times a coupon is available for printout, expiration dates, product images, coupon identification numbers and bar codes.

The main database server 106 also can include an advertising server 108 configured to generate advertising impressions to be imprinted with the coupons, and store the advertising impressions in the advertising repository 116. For example, when a user prints out a coupon, one or more advertising impressions can be displayed on the printed coupon. In some implementations, the advertising impressions can contain text, images or combination thereof. The advertising server 108 can be in the nature of a master advertising database including all of the advertising impressions included in the main database system 106.

The main database server 106 further can include a user server 109 for recording information associated with user transaction history of the client system 104, and storing such data in the user repository 118. For example, the user server 109 can record communication information corresponding to actions or events taken by or involving users of the client system 104 (e.g., each time a coupon is displayed or printed out, the user server 109 can be updated to reflect this action taken). The user server 109 also can contain a record of each downloaded/printed coupon and can provide such data to the client system 104 when requested.

The main database system 106 also can include other databases and/or servers and components not shown in FIG. 1. For example, the main database system 106 can include a website server through which request for coupon distribution from the client system 104 can be received, and an FTP server for storing installation files associated with the setup of the client system 104, for example, for receiving and making requests for coupons. The website server can be configured to provide an interface for effecting a download of client software that a consumer may perform and execute to establish the client system 104 so that the consumer can become an authorized user of the data distribution system 100. The website server can refer an Internet consumer to the FTP server for installation file(s) related to the general setup of the client system 104. The FTP server can be configured to operate in cooperation with the website server to provide, for example, installation or setup programs. The installation program(s) can be downloaded to a general-purpose computer (e.g., PC or a MAC) for installation of the software associated with the client system 104.

As another example, the main database system 106 can include a front-end (not shown) for providing one or more user interfaces to promote communication between the main database system 106 and the client system 104. Through the front-end, the client system 104 can initially request communication with the main database system 106. Such request can be initiated at the start of each new session of the data distribution system 100 or when coupons on the main database system 106 (or the client system 104) are updated. The front-end can provide multiple interface and allocation/direction features for the data distribution system 100.

As yet another example, the main database system 106 can include a handler (not shown) for handling coupon requests from the client system 104. After a new session is established by an authorized user of the client system 104, all subsequent coupon access and requests sent by the client system 104 can be directed to or "handled" by the handler. In response, the handler interfaces with the coupon server 107 by issuing a request or command to ensure that the request sent by the client system 104 is fulfilled. Alternatively, the handler can directly respond to the client system 104 without such a request or command.

Client System

The client system 104 can be any system that uses or deploys software. The software can be a single application or an operating system, a collection of software applications or software components that perform various tasks in a larger system or application.

Similar to the main database system 106, the client system 104 can include one or more general purpose computing systems configured to operate in accordance with an operating system having a graphical user interface. The operating system can be, for example, MAC OS® by Apple Computer, Inc. of Cupertino, Calif., a Microsoft Windows® operating system, Linux, a mobile operating system, control software and the like.

In some implementations, the network 112 can provide users with transparent, virtual access to applications, processes, and functions regardless of the physical location of the client system 104 where applications, processes, and functions reside. For example, a user desiring to obtain coupons can use the client system 104 to interact with the main database system 106 to obtain coupons, regardless of the physical location of the client system 104.

To provide communication between the main database system 106 and the client system 104, users of the client system 104 may be prompted by the main database system 106 to download and execute an executable program that will reside on the client system 104 for managing the handling and printing of coupons. In some implementations, the executable program can install a graphical user interface (GUI) on the client system 104. The GUI can be installed on the client system 104 at the time when a first communication is initiated with the main database system 106.

Alternatively, the GUI can be installed when a request for a coupon is received by the main database system 106. The GUI can include any hardware, software or combination thereof that allows a user to interact with the main database system 106. The GUI can include one or more user interface objects, such as display regions, tabs, buttons and the like. The interaction with the user interface can be performed by an actual user, a third party or another program, such as a program created using macro programming language that simulates the action of a user with respect to the user interface. Exemplary GUIs may be found, for example, in U.S. Co-Pending application Ser. No. 11/527,856, the disclosure of which is incorporated herein by reference in its entirety.

In some implementations, only authorized users can access the client system 104 for requesting and obtaining coupons. In these implementations, each authorized user can be assigned a user identifier (as will be discussed in greater detail below). The user identifier can include a multi-digit number or designated format that can be uniquely assigned by the user server 109 or the coupon server 107. For example, the user identifier can include a predetermined format, such as XXX/XXXXXXXX, where X is a digit between 0-9.

In some implementations, the user identifier can be stored on the client system 104 as a part of an user information object, and be provided to the main database system 106 at the time when a request for coupon or coupons is transmitted. The main database system 106 can correlate the received user identifier with the user information previously registered and stored in the user repository 118. Once authenticated, the user may receive the coupon or coupons as requested.

Coupon Structure

Based on coupon data received from the business groups 102, the main database system 106 can generate, maintain, and track coupons that can be electronically transmitted to users of the client system 104. The structural format of each coupon generally includes an identification of an offer type and an offer value of a product or service. Each coupon also may include a security code, which may be a bar code or other embedded code that is traceable to and which identifies a user (or a computing system) requesting the coupon. Each coupon also may include other identifying features such as holographic images, identifiers and serial numbers, as each will be discussed in greater detail below.

During operation, business groups 102 provide coupon data to the main database system 106. In response, the main database system 106 generates a coupon with the coupon data imprinted thereon. As discussed above, the coupon data can include information such as an identification of a product, a discount value, expiration data, the number of times the coupon can be redeemed or printed, and any other applicable terms and conditions. This information may be presented in the form of text, image, executable code, or any other media, content and the like.

Figure 2:
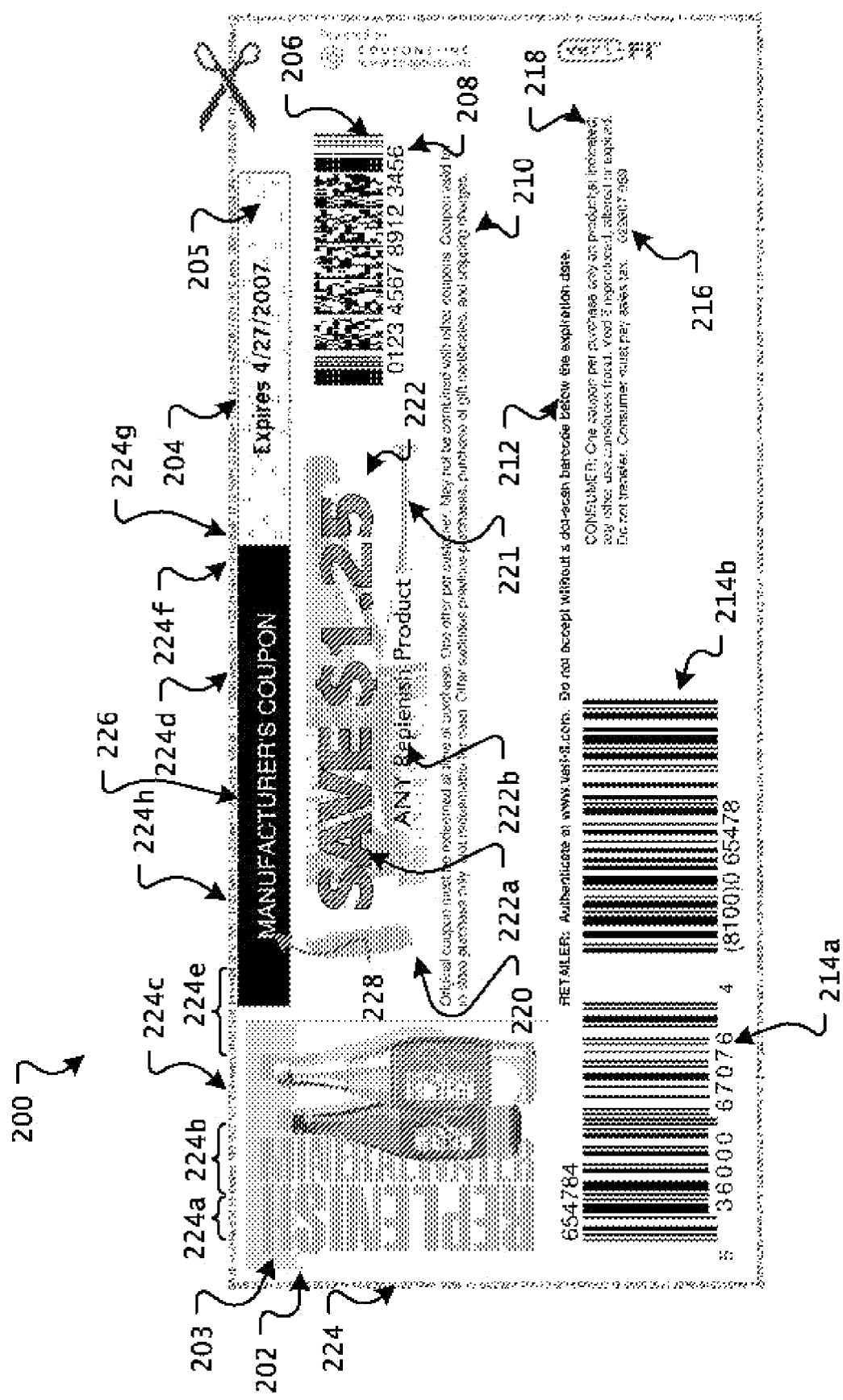
FIG. 2 shows an example of a coupon.

FIG. 2 shows an exemplary coupon 200 with various intrinsic features. Such features may be specified by the main database system 106 and/or by the business groups 102. Referring to FIG. 2, the coupon 200 generally includes an image field 202 for displaying an image 203, an expiration field 204 for specifying an expiration date 205 on which the coupon 200 will be expired, a manufacturer field 226 that specifies the nature of the coupon 200, and an offer field 220 which includes a holographic image 221 and a text string 222 having a primary text field 222a and a secondary text field 222b. The primary text field 222a and the secondary text field 222b can collectively describe the type or coupon value of the coupon 200 when redeemed at a participating retailer.

The text string 222 may include a description pertaining to the coupon value (e.g., "Save $1.25") of the coupon 200, and applicable item(s) (e.g., water products). A description of the coupon value may be placed in the primary text field 222a, while a description of applicable item(s) may be placed in the secondary text field 222b. The coupon value in the primary text field 222a can be arranged adjacent to the description of the applicable item(s) in the secondary text field 222b. Alternatively, the coupon value can be positioned anywhere on the coupon 200 away from the description of the applicable item(s). In these implementations, the primary text field 222a may be utilized to accommodate additional information regarding a particular offer. For example, the additional information can include a coupon type that identifies the product as qualifying for a buy-one-get-one-free or two-for-the-price-of-one offer.

Generally, the coupon value of the coupon 200 can be expressed as a reduced price for the product (e.g., $2.99 after savings), a reduction in the price of the product (e.g., save $1.00) or a reduction in the overall transaction when multiple products are purchased (e.g., save $2.00 when you buy two or more). As shown, a consumer can use the coupon 200 to deduct $1.25 from the purchase of any "Replenish" product. The reduction can be expressed in other mathematical fashions, such as a percentage discount (e.g., 10% off).

The image field 202 can be utilized for visually and graphically identifying a product or service associated with the coupon 200. The image field 202 can be placed in the vicinity of the primary text field 222a or the secondary text field 222b, and can accommodate an image 203 of the product or service associated with the coupon 200. The image 203 can include an image portion and a text portion that supplements the product description in the primary text field 222a or the secondary text field 222b.

The image 203, the expiration date 205 and the text string 222 can be provided by the business groups 102, while the holographic image 221 can be generated by the main database system 106 (e.g., based on the product image 203). The presentation of these data and the inclusion or exclusion and placement of these data may vary from one coupon to another, and can be managed and controlled by the main database system 106. As an example, other than an image of a product, the main database system 106 may display, in the image field 202, images associated with a brand, a logo, a manufacturer, a service provider or a service provided by the service provider. As another example, the main database system 106 may display the expiration date 205 in the format of "Apr. 27, 2007", instead of "Apr. 27, 2007".

Coupons can generally be obtained by submitting a request from the client system 104 to the main database system 106. In some implementations, the request may include a selection of a coupon or coupons and/or unique information related to the client database system 104 such as, but are not limited to, hard disk information and software identifier (e.g., software license number). In these implementations, the unique information may be retrieved using the client software that may have been downloaded by the client database system 104 for establishing communications between the client database system 104 and the database distribution system 100. In other implementations, the user of the client system 104 may be prompted by the main database system 106 to manually submit the unique information at the time of or prior to requesting or selection of a coupon or coupons. If desired, the unique information also may be hashed (e.g., by private or public network keys) to further enhance their uniqueness to prevent fraudulent attempts to re-create the unique information. A signature (a one way transform of the unique value) created from the unique information may be forwarded and stored in the user repository 109 for future authentication.

In some implementations, if a previous record of the personal information is found, in one implementation, the main database system 106 may authenticate the identity of the user by querying the user server 109 and verifying the personal information based on, for example, the proof of identification submitted by the user. In these implementations, any coupon with unauthorized manipulation of coupon data, graphics data and security data can be traceable to the originating user (e.g., user of the client system 104) to whom the coupon was issued, establishing fraud protection that can neither be altered nor tampered by the user.

In some implementations, information that are not sufficient to identify or convey the identity of the users may be used instead of personal information and proof of identification. For example, a coupon request may include a selection of a coupon or coupons, and a selection of a general geographic area in which the user resides. As another example, a coupon request may include demographic information (e.g., gender, ethnicity, etc).

The expiration field 204 includes a text string that specifies the expiration date 205. In some implementations, an image overlay or gradient pattern is added to the expiration field 204 so that the image overlay or the gradient pattern can be seamlessly blended with the text string. In another implementations, a single image or a sequence of tiled images can be used to fill the expiration field 204.

The manufacturer field 226 may include a text string 228 that describes that nature of the coupon. For example, the text string 228 may read "Manufacturer's Coupon". In this example, the text string "Manufacturer's Coupon" may mean that the manufacturer associated with the coupon 200 would reimburse a retailer for the face or coupon value of the coupon 200 when the coupon 200 is redeemed.

In some implementations, similar to the expiration field 204, the manufacturer field 226 also may include a predefined image pattern overlaying over or blended with the text string 228 to create a composite image that is resistant to unauthorized copying. The image pattern may exhibit graphics effect of a particular kind.

Other custom textures using various techniques such as layer effects and filters of the image overlay, or adjustment to contrast, brightness, saturate, hue, and color of the text string of the expiration date 205 or text string 228 of the manufacturer's field 226 also are contemplated.

By leveraging the availability of various textures and effects, a multitude of different designs to the composite image can be generated over the expiration field 204 and the manufacturer field 226, which makes forgeries difficult.

In some implementations, data associated with the expiration date 205 also can be imprinted on the coupon 200 using a different format and placed in a different location (e.g., in conjunction with or as an alternative to the expiration date 205 shown in the expiration area 205). In these implementations, the expiration data may include a date on which the coupon 200 was printed, and the number of days remaining to the expiration date from the date on which the coupon 200 was printed. As an example, assuming that the coupon 200 was printed out by a user of the client system 104 on "Feb. 26, 2007" and the expiration date of the coupon 200 is set on "Apr. 27, 2007", then the number of days remaining until the expiration date is fifty nine days. The date on which the coupon 200 was printed, together with the number of days remaining, can be converted into a series of numerical digits (e.g., converting "Feb. 26, 2007" to "022607" and fifty nine days to "059" to create "022607 059") to conceal the meaning of these data, and placed in an unnoticeable area on the coupon 200. As an example, this data can be printed in the information section 218.

In some implementations, coupon value falsification can be minimized by overlaying the holographic image 221 over the text string 222 pertaining to the description of coupon value. For example, when color inconsistencies are found between the holographic image 221 and the text string 222, retailers can quickly identify and determine the potential tampering of the coupon value so as not to accept the coupon with such defect. The holographic image 221 may be an overlaid image that can be merged or superimposed over the text string 222 to create a composite image.

To produce the holographic image 221, in some implementations, the product image 203 may be used (e.g., by the holographic module 380) to create a high resolution source image. Then, the high resolution source image may be segmented (e.g., by the segmentation module 385) into a plurality of smaller image regions. Each image region may be, for example, rectangular shape. Other alternative shapes or segmentation techniques, including overlapping shapes, also may be employed to divide the high resolution source image into smaller image regions. The high resolution source image can be segmented into a predetermined number of smaller image regions, or into regions each having an identical dimension (e.g., height and weight).

Once the high resolution source image is segmented into a plurality of image regions, analysis can be performed (e.g., by the analysis module 390) to identify one or more characteristics for each segmented region. The characteristics may include, without limitation, luminance, contrast, variance, color, hue and brightness. For example, the analysis module 380 may determine that one image region may have a low contrast and high brightness value associated therewith. As another example, the analysis module 380 may determine that another region may have a high contrast but low brightness value associated therewith.

The dynamic range of an image region can be characterized by a histogram on the image region. Thus, in some implementations, a global histogram may be derived from the high resolution source image, the result of which can be used to compare and evaluate each segmented region. For example, the global histogram can be used as an indicator for identifying image regions that have high and low degree of luminance or contrast. In these implementations, image regions having a higher or lower level of luminance or contrast can be omitted as candidates for the holographic image 221.

In some implementations, a weight mechanism can be used to access and assign weight values to each individual region as a function of the one or more characteristics. For example, regions having a contrast value higher than a predetermine level are assigned a value of "1" while regions having a contrast value lower than the predetermine level are assigned a value of "0". As another example, regions having a brightness value higher than a predetermine level are assigned a value of "1" while regions having a brightness value lower than the predetermine level are assigned a value of "0".

Subsequently, a region having the highest weight value can be used as the holographic image 221. In this implementation, the region may be stretched to a size that matches the size of the offer field 220. Stretching an image causes the image to be distorted and to have a different aspect ratio, thus making reproduction or duplication of an exact holographic image similar to the holographic image 221 difficult. If desired, other graphics effects also may be added to augment the appearance of the holographic image 221 (e.g., fading effects or rounded corner effects for corners of the holographic image 221) to convey the intricacy of the holographic image 221.

In some implementations, regions adjacent to the region having the highest weight and having similar characteristics also can be used to produce the holographic image 221. For example, adjacent image regions of equal brightness may be grouped with a matching region to establish a composite image that can be used as the holographic image 221. In these implementations, the number of regions to be grouped depends on the size of the offer field 220. For example, if the offer field 220 is a 400 pixel.times.400 pixel area and each image region is 20 pixel.times.20 pixel, then twenty image regions would be grouped to create the holographic image 221.

The text string 222 may render unreadable if the text string 222 and the holographic image 221 are similar in color or brightness. Thus, in some implementations, the visual representation of the text string 222 and other overlaying data may be graphically compensated to provide adequate contrast to the holographic image 221. For example, the border of the text string 222 may be bolded (e.g., adjusting polarity or color). As another example, the outline of each character of the text string 222 may be traced to generate an embellishment contour for each character as if the text string 222 has both the outer and inner border. As yet another example, drop shadow may be added to each character of the text string 222 to create a three-dimensional depth appearance that distinguishes over the two-dimension holographic image 221. As yet another example, the font used to create the text string 222, text string 228, or those in the expiration field 204 may be custom made (i.e., using proprietary fonts). Other imaging techniques also can be employed for creating a contrast between the text string 222 and the holographic image 221. It should be noted that any of the foregoing techniques also may be implemented to augment the security features already discussed to enhance coupon protection. While the holographic image 221 as described above is shown as a two dimensional image, three dimension and four dimensional images also are contemplated.

In some implementations, the holographic image 221, the text string 222, the expiration date 205 and its surrounding pattern are imprinted in a manner that when the coupon 200 is copied by conventional color copiers, the color copiers reproduce these elements as obscure objects. For example, reproduction causes the holographic image 221 and the text string 222 to be reproduced as dark objects on the illegitimate copy. As a result, the offer field 220 has no contrast, or has very little contrast depending on the copiers used, with the result that the information in the offer field 220 becomes substantially illegible for the coupon 200 to be redeemed.

The coupon 200 also can include identification indicia such as a 2D bar code 206, an identifier 208, a first serial number 214a and a second serial number 214b. In some implementations, the bar code 206 and the identification number 208 can be generated by the main database system 106, while the first serial number 214a and second serial number 214b can be provided by the business groups 102.

In some implementations, the identifier 208 may be defined as a promotion identifier unique to a specified discount offer or promotion. In another implementations, the identifier 208 uniquely identifies a particular print instance of the coupon 200. In yet another implementations, the identifier 208 may change each time the coupon 200 is printed.

The main database system 106 also may generate the identifier 208 based on, for example, the product or service being promoted, and the number of coupons expected to be available. This permits each coupon issued by the main database system 106 to be associated with a specific and unique identifier to increase the difficulty of producing counterfeit coupons. A retailer can scan the identifier 208 for validity, and the information received from scanning can be immediately transmitted to the main database system 106 for verification and confirmation. If the identifier 208 is confirmed, the sale transaction can be supplemented with the coupon value stated in the offer field 220.

The bar code 206 can include a group of parallel lines that encodes the identifier 208, and can be used to identify the coupon 200. The bar code 206 and the identifier 208 can be unique and different for each coupon to deter coupon duplication. In some implementations, the bar code 206 and the identifier 208 may be used for tracking the coupon 200 if the coupon 200 is lost, damaged or stolen. In these events, the main database system 106 may issue, to the user of the client system 104, a substitute coupon as original for redemption. If desired, the bar code 206 and the identifier 208 also can include information sufficient to identify the product or service for which the coupon 200 is valid, the coupon value being offered, expiration date and the like.

In some implementations, the first serial number 214a can be a universal product code (UPC). The UPC can include parallel lines, guard bars and bit patterns, and encode a 12-digit number. The parallel lines and guard bars are generally sized and spatially arranged in accordance with bar code standards. Conventionally, the first digit of the number generally identifies the first serial number 214a as a UPC, which is followed by five digits that denote the manufacturer of the product for which the coupon is valid, which is followed by three digits that designate a family code assigned by the manufacturer for the product, which is followed by two digits that characterize the coupon value or coupon type. The last digit of the UPC is a check digit that is used by UPC scanners to verify that the previous eleven digits were read properly.

In some implementations, the first serial number 214a can be followed by a second serial number 214b which further identifies the characteristics of the coupon 200. For example, the second serial number 214b can uniquely encode manufacturer information used by the manufacturers or service providers. Of course, the second serial number 214b may also include duplicate information already encoded in the first serial number 214a so as to prevent unauthorized falsification of the first serial number 214a without also falsifying the second serial number 214b.

In some implementations, it is possible to have more than one type of coupon associated with a single UPC. The UPC can have associated therewith multiple coupons or coupon values provided by the business groups 102. As an example, a coupon can include a first coupon code associated with one geographic location and a second coupon code associated with a second geographic location. Of course, if desired, the manufacturers or service providers may also use two or more coupon codes in a single UPC for a single geographic location. While the first serial number 214a has been described in the form of a UPC, other bar code standards such as Plessey, Codebar and E.A.N. also are contemplated.

The coupon 200 further includes a disclaimer section 210 associated with the proper usage of the coupon 200 (e.g., not redeemable for cash; valid only for in-store purchases only; offer excludes previous purchases), an instruction section 212 setting forth instructions to the retailers (e.g., do not redeem if the coupon is not legible; do not accept without a bar code or coupon identifier), and an information section 218 providing information to users with respect to the redemption of the coupon 200 (e.g., one coupon per purchase; the coupon is void if reproduced, altered or expired). These data can be supplied by the business groups 102, or imprinted by the main database system 106 directly. The coupon 200 may be issued by the main database system 106 to a user (or users) of the client system 104 in accordance with the instructions provided by the business groups 102. For example, the instructions may include issuing the coupon 200 to a pre-selected number of users, or issue the coupon 200 to users falling under a particular demographic group or residing in a particular area.

A border 224 may be added to the coupon 200. In some implementations, the border 224 embeds therein new or reiterative information that may augment the data on the coupon 200. In these implementations, such information may be formatted in a form of a repeating pattern along the border 224. The information may include, without limitation, a coupon value 224a (e.g., "Save $1.25"), an expiration date 224b (e.g., expires "Apr. 27, 2007"), a platform identifier 224c which includes a sequence of digits (e.g. "50119340") that collectively identify the computing platform from which the coupon 200 was printed (e.g., the client database server 104), a browser identifier 224d that identifies the type of browser used to print the coupon 200 (e.g., "wnex" as Window Explorer®), a coupon identifier 224e that identifies the coupon 200, the number of times 224f the coupon has been printed (e.g., "02" means twice), a date 224g on which the coupon 200 was printed 224g (e.g., "Feb. 26, 2007" as Feb. 26, 2007) and a time 224h at which the coupon was printed. Other information including the number of coupons selected and printed by a user within a given print session, the number of prints for a single coupon printed by the user within a given print session and coupon identifier, personal information such as social security and phone number, the uniform resource locator of the manufacturers or suppliers also can be included in the border 224. Alternatively, these information can be imprinted on the face of the coupon 200 separate from the border 224.

If desired, a border similar to border 224 embedding computer information may be generated for the expiration field 204. Specifically, the expiration field 204 may include a border embedded with information that may be gathered, for example, from the client database system 104 (and in some implementations, the main database system 106). For example, as shown in FIG. 2, the expiration field 204 may include a border 207 embedded with a platform identifier which includes a sequence of digits (e.g. "50119340"), a browser identifier that identifies the type of browser used to print the coupon 200, a coupon identifier that identifies the coupon 200, a number of times the coupon has been printed, and date and time associated with the printing of the coupon 200. One of ordinary skill in the art would appreciate that the aforementioned embedded information is not limited, and the border 207 also may include other information (e.g., information unique to an individual coupon).

In some implementations, the platform identifier 224c may be generated when the client system 104 first requests communication with the main database system 106. During this phase, the client system 104 may be prompted by the main database system 106 to download and execute an executable program that will reside on the client system 104 for managing the handling and printing of coupons. The executable program can generate the platform identifier 224c, which can be unique to the client system 104, and store the platform identifier 224c at the client system 104. The client system 104 may provide the platform identifier 224c to the main database system 106 at the time when a request for new coupon data is transmitted. The main database system 106 can correlate the received platform identifier 224c with the identification previously registered and stored in the user server 109 to authenticate the client system 104. The platform identifier 224c also may be used to trace a user or users of the client system 104 so as to discourage the production of counterfeit coupons.

Alternatively, other identifiers may be used. For example, a unique user identifier may be assigned to each user of the client system 104 (e.g., user identifier "A" for user "A" and user identifier "B" for user "B"). The user identifier may be assigned when a user establishes a user account with the main database system 106. Alternatively, the user identifier may be generated by the executable program that the user executes to establish communication with the main database system 106.

With coupon data embedded in the border 224, the border 224 can create an added level of fraud resistant by insuring that each set of coupon data is uniquely identifiable and matches data on other portions of the coupon, which increases verification accuracy and decreases the likelihood of code breaking, and allows the main database system 106 or retailers to conveniently verify the authenticity of the coupon 200.

Example Process for Generating a Halographic Image

Figure 4:
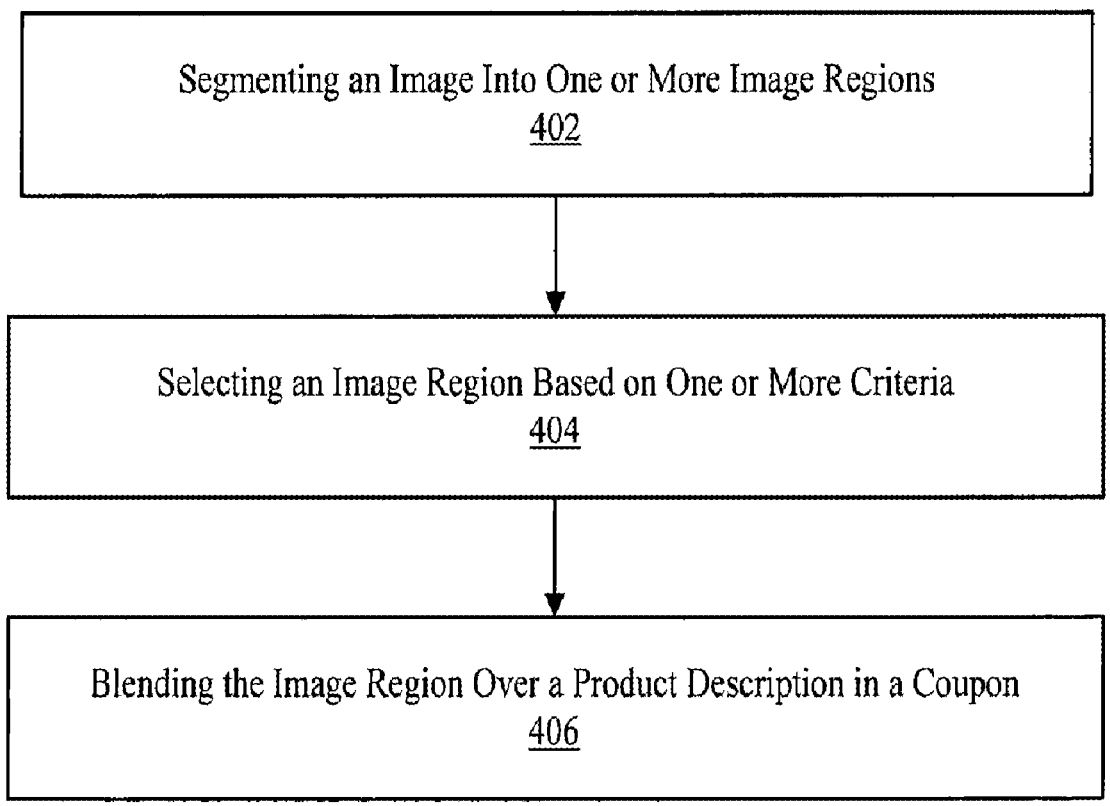
FIG. 4 shows an example flow chart for generating a holographic image.

FIG. 4 is a flow diagram of an example process 400 for generating a holographic image. The process 400 may be performed, for example, by the main database system 106, and for clarity of presentation, the description that follows uses this database system as the basis of examples for describing the process 300. However, another system (e.g., client database system 104), or combination of systems, may be used to perform the process 400.

In the example shown, the process 400 begins with segmenting an image into one or more image regions (402). In some implementations, the image may be a product image. In some implementations, segmenting an image into one or more image regions includes evaluating an image characteristic associated with each image region. Then, the process proceeds with selecting an image region based on one or more criteria (404). In some implementations, selecting an image region based on one or more criteria includes identifying one or more regions whose image characteristic meets a predetermined image criterion (e.g., a predetermined brightness, contrast, etc.), and combining the identified regions to create a composite image. The process ends with blending the image region over a product description in a coupon (406). One of ordinary skill in the art would readily understand that this example process is not limited to blending the image region over a product description in a coupon, and that the image region also can be applied in other field(s) of the coupon (e.g., expiration field 204 and manufacturing field 202).

Hardware System

Figure 5:
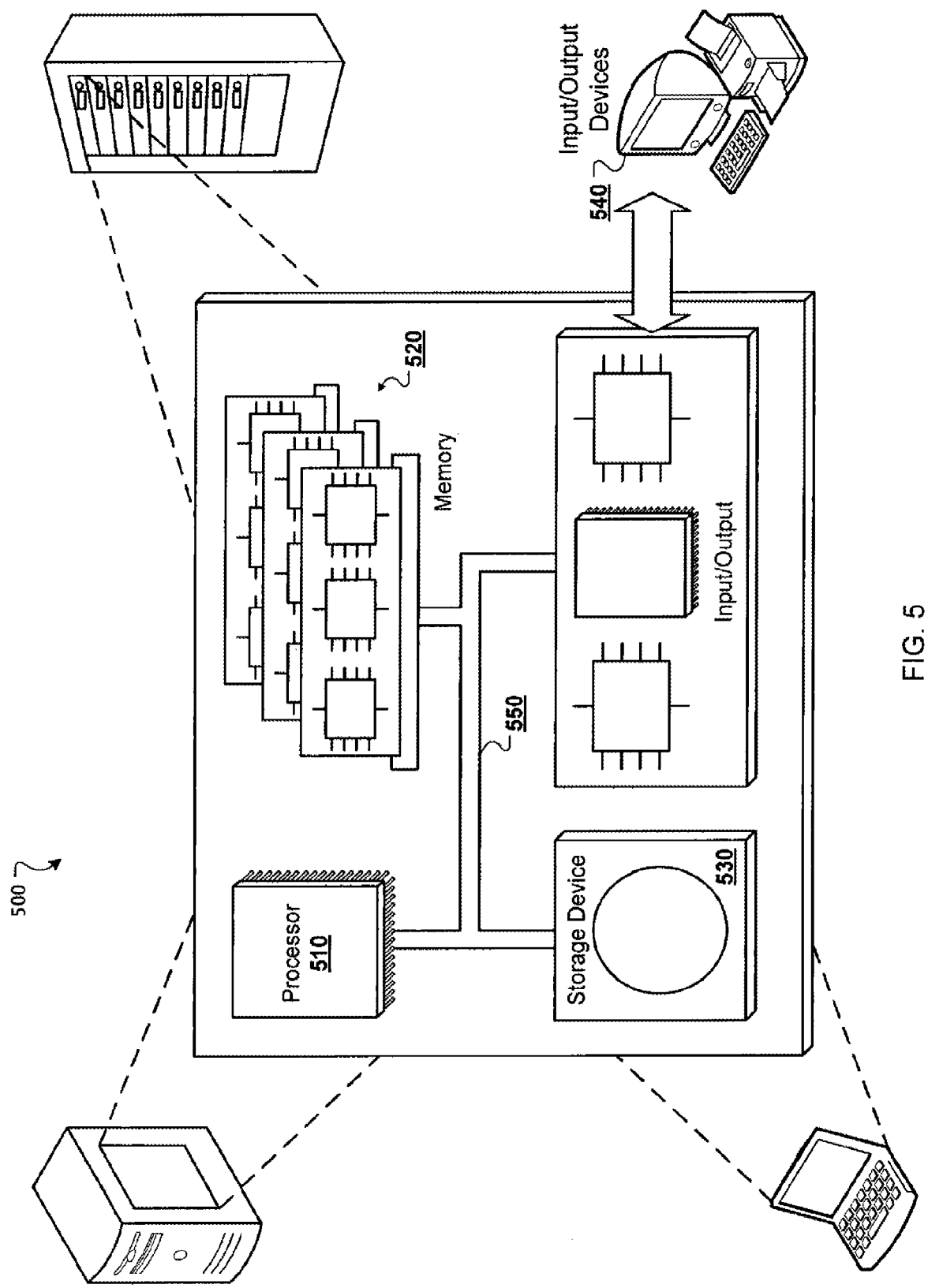
FIG. 5 is a block diagram illustrating a hardware system.
Like reference symbols in the various drawings indicate like elements.

FIG. 5 is a block diagram illustrating a hardware system 500. The system 500 may be included in either or all of the business groups 102, client system 104 and the main database server 106. The hardware system 500 shown can be implemented as a computing device including a desktop or portable computer, an electronic device, a telephone, a cellular telephone, a display system, a television, a monitor, a navigation system, a portable music device, a personal digital assistant, a handheld electronic device, an embedded electronic device or appliance or other forms of devices with user interfaces. The hardware system 500 can be a standalone computer that can interface with other desktop computers, network computers and servers to access and exchange files or information that is not stored locally.

Referring to FIG. 5, the system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some implementations, the processor 510 is a single-threaded processor. In another implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In another implementations, the memory 520 is a volatile memory unit. In yet another implementations, the memory 520 is a non-volatile memory unit.

The storage device 530 is capable of providing mass storage for the system 500. In some implementations, the storage device 530 is a computer-readable medium. In various different implementations, the storage device 530 may be a floppy disk device, a hard disk device, an optical disk device, or a tape device.

The input/output device 540 provides input/output operations for the system 500. In some implementations, the input device may include a keyboard, mouse, touch pad, stylus pen, and/or other pointing device to allow user input, and the output device may include a display unit for displaying graphical user interfaces, a printer for printing "hardcopy" of a coupon and other output devices that provide information to the users.

In some implementations, if a keyboard is used as one of the input devices, the keyboard can be a physical QWERTY device, a phone dial pad, a keypad, mouse, jog wheel, joystick, game pad or other input device. In other implementations, the keyboard can be a virtual or soft key keyboard displayed on, for example, the display device or other touch screen device. In some implementations, the keyboard allows a user to input information with keystrokes which can be translated to electrical or data signals. Information provided by the input devices can be in the form of navigational, functional, textual or other input. Navigation information can be directional (e.g., up, down, left, or right). The keyboard also can provide other forms of input including functions (e.g., a selection function for selecting an object), text input and the like. Information can be provided by the user manipulating the input devices. In some implementations, the processor(s) 510 can generate and display information to the display devices in response to user interactions received through the input devices.

Each of the hardware components described in the system 500 can exchange communications and data via the system bus 550. The system bus 550 may include, without limitation, PCI, PCI Express, USB, FireWire™, NuBuS™ and PDS.

In some implementations, the system 500 also includes computer-readable medium(s) (not shown). Computer-readable medium refers to any medium that participates in providing instructions to the processor 510 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium may include a window server adapted to execute tasks (e.g., serving windows) on behalf of a user (or operating system), and an operating system responsible for the direct control and management of hardware and software operations. The operating system can be multi-user, multiprocessing, multitasking, multithreading, real-time and the like. The operating system can be, for example, MAC OS® by Apple Computer, Inc. of Cupertino, Calif., a Microsoft Windows® operating system, Linux, a mobile operating system, control software, and the like. More generally, a kernel layer (not shown) in the operating system can be responsible for general management of system resources and processing time. A core layer can provide a set of interfaces, programs and services for use by the kernel layer. A user interface layer can include APIs (Application Program Interfaces), services and programs to support user applications.

In some implementations, the operating system can execute and display one or more graphical user interfaces. A user interface may be understood to mean any hardware, software or combination of hardware and software that allows a user to interact with a computer system, and to include one or more user interface objects. User interface objects may include display regions, user activatable regions and the like.

The graphical user interface can display individual items including, for example, an icon, a shortcut, a program launcher, a button, a menu bar, navigation items, a window, selections and the like. Each item can provide access to functionality, applications, configuration of a user account, and data associated with a particular user.

Generally, the operating system can perform basic tasks, including, but not limited to: recognizing input from input devices; sending output to display devices; keeping track of files and directories on computer-readable mediums (e.g., memory or a storage device); and managing traffic on the bus.

The features described herein can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

A number of implementations have been described. Nevertheless, it will be understood that various modifications may be made. For example, elements of one or more implementations may be combined, deleted, modified, or supplemented to form further implementations. As another example, a database server or repository need not perform all, or any, of the functionality attributed to that database server or repository in the implementations described above, and all or part of the functionality attributed to one repository may be performed by another database server or repository, another additional module, or not performed at all. As yet another example, other data such as names of retailers at which a coupon can be redeemed also can be printed on the coupon. As yet another example, the holographic image 222 may be applied to documents other than a coupon including, without limitation, currency, stock certificates, bond certificates, special event tickets, tax stamps, official certificates, passports, bank and travelers checks, anti-counterfeiting labels, birth certificates, land deed titles, visas, food stamps, lottery tickets, driver licenses, insurance documents, wills, coupons, rebates, contracts, test answer forms, invoices, inventory forms and artwork to ensure the authenticity of these articles.

What is claimed is:
1. A method comprising:
receiving a source image depicting a product that is the subject of a product coupon;
segmenting the source image into two or more image regions;
evaluating an image characteristic associated with each image region;
identifying one or more regions whose image characteristic meets a predetermined image criterion; and
combining the identified regions to create a composite image;
wherein the number of identified regions is less than the number of image regions;
wherein both the composite image and the source image are applied to the product coupon;
wherein the method is performed by one or more computing devices.
2. The method of claim 1,
where segmenting the source image into two or more image regions includes segmenting the source image into two or more image regions each having an identical dimension.

3. The method of claim 1,
where segmenting the source image into two or more image regions includes segmenting the source image into two or more image regions each region having a same shape.

4. The method of claim 1,
wherein identifying one or more regions that meets a predetermined image characteristic includes determining one or more regions having a similar image characteristic; and
wherein combining the identified regions to create a composite image includes grouping the determined regions to create the composite image.

5. The method of claim 1, further comprising:
blending the composite image over a predetermined portion of a corresponding product coupon.

6. The method of claim 5, further comprising:
applying a visual effect on the composite image, wherein blending the composite image includes overlaying composite image applied with the visual effect over the predetermined portion.

7. The method of claim 1,
wherein evaluating an image characteristic includes determining a global histogram associated with the source image; and
wherein identifying one or more regions includes identifying one or more regions based on the global histogram.

8. The method of claim 1,
wherein evaluating an image characteristic includes assigning one or more weight values to each image region; and
wherein identifying one or more regions includes identifying one or more regions based on the weight values assigned to each image region.

9. The method of claim 8, where combining the identified regions to create a composite image includes:
identifying one or more regions adjacent to the identified regions and having one or more similar characteristics; and
combining the identified regions and the adjacent regions to create a composite image.

10. The method of claim 1, wherein the composite image is applied to the product coupon as a holographic image.

* * * * *